United States Patent
Castellani et al.

(10) Patent No.: US 7,647,534 B2
(45) Date of Patent: Jan. 12, 2010

(54) METHOD FOR AVOIDING REPETITION OF USER ACTIONS BY USING PAST USERS' EXPERIENCES

(75) Inventors: Stefania Castellani, Meylan (FR); Nicola Cancedda, Grenoble (FR); Maria Antonietta Grasso, Grenoble (FR); Jacki O'Neill, Hebden Bridge (GB)

(73) Assignee: Xerox Corporation, Norwalk, CT (US)

( * ) Notice: Subject to any disclaimer, the term of this patent is extended or adjusted under 35 U.S.C. 154(b) by 446 days.

(21) Appl. No.: 11/378,134

(22) Filed: Mar. 17, 2006

(65) Prior Publication Data

US 2007/0220365 A1    Sep. 20, 2007

(51) Int. Cl.
*G06F 11/00* (2006.01)

(52) U.S. Cl. .............................. 714/46; 714/33; 714/37; 714/44

(58) Field of Classification Search ..................... 714/46
See application file for complete search history.

(56) References Cited

U.S. PATENT DOCUMENTS

| | | | |
|---|---|---|---|
| 5,204,968 A | 4/1993 | Parthasarathi | |
| 5,490,089 A * | 2/1996 | Smith et al. ................... | 399/81 |
| 6,314,249 B1 | 11/2001 | Lay et al. | |
| 6,556,926 B1 | 4/2003 | Haines | |
| 6,782,495 B2 | 8/2004 | Bergklau-Halvor | |
| 2003/0088528 A1 | 5/2003 | Parry | |

FOREIGN PATENT DOCUMENTS

EP    0 630 146    12/1994

OTHER PUBLICATIONS

N. Cancedda, E. Gaussier, C. Goutte, J.M. Renders, *Word-Sequence Kernels*, Journal of Machine Learning Research, pp. 1059-1082, Feb. 3, 2003.
H. Lodhi, N. Cristianini, J. Shawe-Taylor, C. Watkins, *Text Classification Using String Kernels*, Advances in Neural Information Processing Systems13, MIT Press, 2001.
Gregory Grefenstette, *Short Query Linguistic Expansion Techniques: Palliating One-Word Queries by Providing Intermediate Structure to Text*, Rank Xerox Research Centre, 38240 Meylan, France, 1997.

* cited by examiner

*Primary Examiner*—Scott T Baderman
*Assistant Examiner*—Jigar Patel
(74) *Attorney, Agent, or Firm*—Fay Sharpe LLP

(57) ABSTRACT

A method for assisting a user to connect a problem with a device, such as a printer includes extracting, from records comprising user actions on the device, string of user actions on the device. The string of user action is compared with at least one predetermined sequence of user actions for correction of predefined problem with the device. Based on the comparison, an evaluation is made as to whether at least one prior user has attempted the predetermined sequence and, if so, a procedure is implemented to avoid a user repeating the prior attempt.

23 Claims, 4 Drawing Sheets

US 7,647,534 B2

METHOD FOR AVOIDING REPETITION OF USER ACTIONS BY USING PAST USERS' EXPERIENCES

BACKGROUND

The exemplary embodiment relates to methods for correcting a problem with a device, such as a printer. In particular, it relates to the interactions between a user and the device, which are informed by prior user interactions, thereby reducing the repetition of unsuccessful user actions.

Office printers and multifunction devices (MFDs) with printing capabilities are typically shared resources which are utilized by multiple users who have access to their services. When a printer malfunctions, a user will often attempt to solve the problem themselves before seeking the assistance of an experienced technician. Typical problems arise because of machine faults, such as paper jams, or poor print quality on the output documents, e.g., white lines on the paper. When a user has a problem with a printer, typically the user will first attempt to ascertain and fix the problem using whatever built-in diagnosis tools are provided with the printer. For some printers the built-in diagnostic tools may be in the form of a user manual or diagrams on the user interface showing possible locations of printer jams and out-of-supply notices. For printers linked to a personal computer, the install disk of the printer may include diagnostics in the form of a utility program to be run on the user's personal computer. Utility programs may offer suggestions for relatively minor problems, such as cleaning inkjets to improve print quality or how to ascertain a printer jam. Some of the problems can be readily solved by the users with the help of instructions provided by the printer or made available to the user by an on-line support system, such as a knowledge base. Sometimes the user is not able to solve the problem, and the assistance of local or remotely located technicians is sought.

Solving the problems encountered can be time consuming and frustrating for the users and costly for the owner of the printer in terms of technical services and loss of productivity. Diagnostic systems for identifying the cause of the malfunction and help systems associated with the printer can be of help to users in some instances. Machine problems commonly have escalating stages of solutions, either because the same symptoms may be caused by different faults with different solutions or the same fault may have a number of different solutions, some more simple than others. Thus, the online knowledge base of a printer typically shows a number of solutions which should be tried in order; with the simplest solutions being presented to the user first and gradually progressing to the most complex solutions. Not all problems/solutions may be available in the knowledge base. For example, instructions to clear a jam may be the first level for a fault that indicates a jam. However the problem may actually be caused by dirty sensors, so the next level of troubleshooting (which may not be shown on the printer), may be to clean the sensors.

Because of these different levels of solutions, a user trying a particular solution may not solve the problem. Thus, because of the shared usage of the printer, when a problem occurs, a number of users may follow the instructions provided by the printer yet be unable to solve the problem. Successive users may thus try to solve the problem without knowing of the prior failed attempts of other users. This can result in a waste of user's time, customer dissatisfaction, down time of the printer, and reduced trust in the instructions provided by the on-line support system.

INCORPORATION BY REFERENCE

U.S. Pat. No. 6,556,926, entitled "SYSTEM FOR DETERMINING WHEN A COMPONENT IN A PRINTER SHOULD BE REPLACED," by Haines discloses a computer that monitors one or more printers over a network in order to determine when components in each of the printers should be replaced. If the computer determines that a component should be replaced, the computer can automatically transmit an order for a new component to a vendor.

U.S. Pat. No. 6,782,495, entitled "METHOD FOR ANALYZING PRINTER FAULTS," by Bernklau-Halvor discloses a method of diagnosing a printer problem which includes correlating a wide range of printer data types with suggested solutions. Printer diagnostic data, which may include usage information and printer status information collected over a period of time, is parsed into individual components. The components are then input into a set of rules. Each rule compares each component with a corresponding reference value to generate a comparison result, correlates the comparison result with a set of actions including solutions, and if there is a correlation between the comparison result and a solution, providing the solution.

U.S. Published Patent Application No. 2003/0088528, published May 8, 2003, entitled "METHOD AND SYSTEM FOR PRINTER SUGGESTED TRAINING," by Parry, discloses a system and a method for printer suggested training using fuzzy logic analysis. A printer tracks printer usage relative to the features of the printer and the type of print jobs performed. Using a fuzzy logic protocol, the printer then selects an appropriate training package based upon the tracked usage. A message is then generated and sent to a network administrator, or other user, suggesting the selected training package.

BRIEF DESCRIPTION

Aspects of the exemplary embodiment relate to a method and a system for assisting a user to correct a problem with a device. And to a method of forming such a system.

In one aspect, a method for assisting a user to correct a problem with a device includes extracting, from records comprising user actions on a device, a string of user actions on the device, comparing the string of user actions with at least one predetermined sequence of user actions for correction of a predefined problem with the device and, based on the comparison, evaluating whether at least one prior user has attempted the predetermined sequence. If so, the method includes implementing a procedure to avoid repeating the prior attempt.

In another aspect, a system includes a user interface for interacting with a user. A memory stores instructions for identifying a string of actions on a device, instructions for comparing the string of actions with a predetermined sequence of actions, and instructions for interacting with a user based on the comparison. A processor retrieves records comprising user actions on the device, the processor executing the instructions for identifying a string of actions, the instructions for comparing the string of actions with at least one predetermined sequence of actions for correcting a problem, and the instructions for interacting with the user.

In another aspect, a computer readable medium includes instructions, which when executed on a processor, extract, from records comprising user actions on a device, a string of user actions on the device, compare the string of user actions with at least one predetermined sequence of user actions for correction of a predefined problem with the device, based on the comparison, evaluate whether at least one prior user has attempted the predetermined sequence, and implement a procedure for avoiding a repeat of the prior attempt.

In another aspect, a method for forming a system for assisting a user to correct a problem with a device includes assigning elements of a finite alphabet to user actions associated with a device, the actions including actions taken to correct problems with the device. For each of a plurality of ideal sequences of user actions for correcting problems with the device, a sequence of elements corresponding to the actions is identified and stored in memory. Instructions are provided for comparing a string of user actions on the device expressed in the finite alphabet with at least one of the stored sequences to compute a measure of similarity for use as an indicator of whether a prior user has attempted the stored sequence.

DETAILED DESCRIPTION

Figure 1:
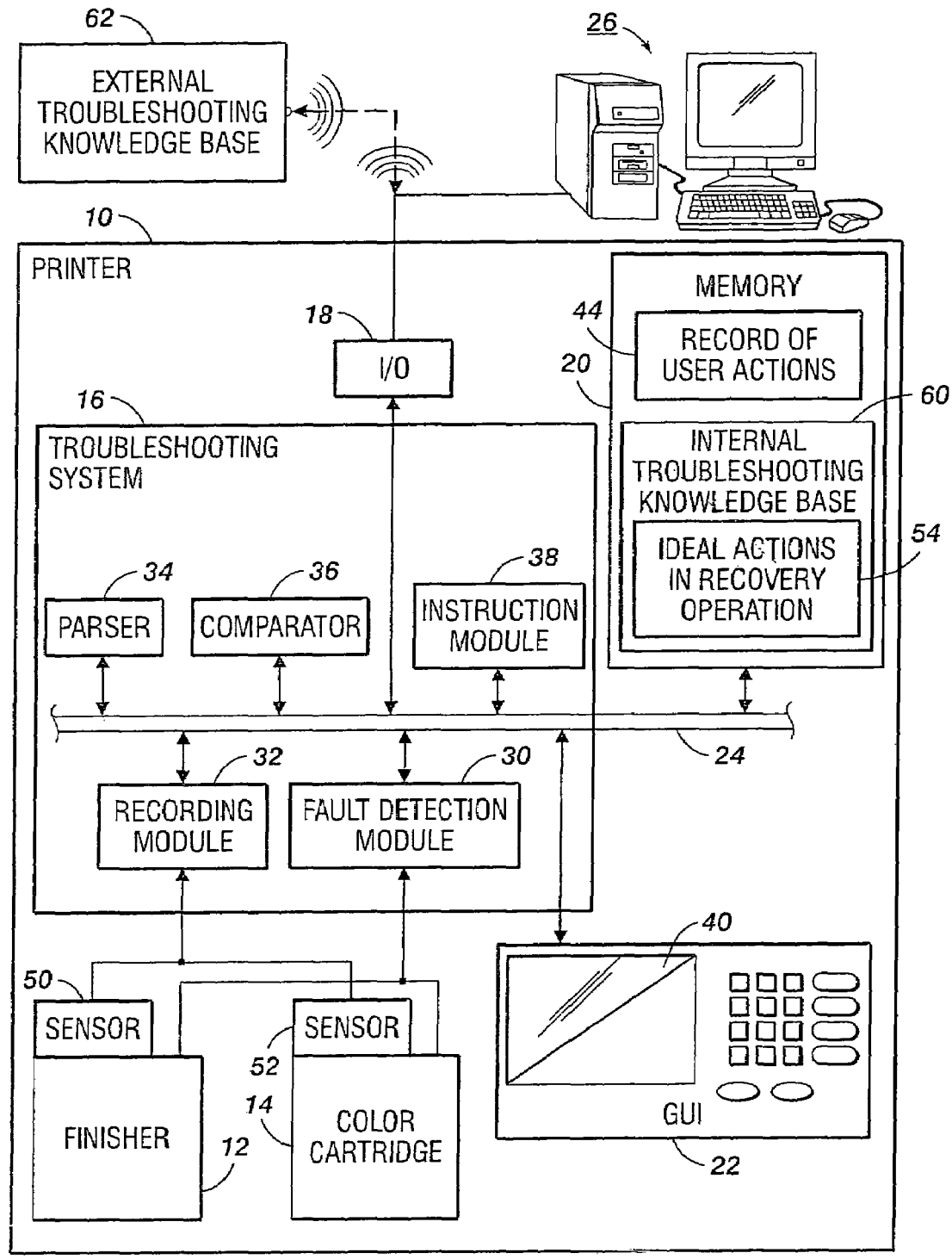
FIG. 1 is a block diagram of a printing system according to the exemplary embodiment.

Aspects of the exemplary embodiment relate to a method and a system for correcting a problem with a device, such as a printer and to a method of developing such a system. While the exemplary embodiment is described with particular reference to printers, it is to be appreciated that the device can be any device subject to malfunction which is typically utilized by several users. Printers are exemplary of such devices in that they are often utilized in organizations as shared devices and as such tend to be situated in communal places easily accessible by their users, such as corridors and alcoves. They are frequently shared by a number of users and the on-printer troubleshooting instructions along with users' work practices tend to lead to shared responsibility for fixing minor problems.

In one aspect, a method for providing a user with instructions for correcting a problem with a device, such as a printer, includes retrieving stored data which includes records of prior user actions with a device. From the records, a string of user actions is extracted, for example, by selecting a time window in which to examine the records and parsing the stored records within that time window to identify individual actions. The string of user actions is compared with at least one predetermined sequence of user actions (an ideal sequence) which has been established for correction of a predefined problem with the device. On the basis of the comparison, an evaluation can be made as to whether a prior user has attempted the predetermined sequence. In particular, the result of the comparison can be used as an indicator of whether a prior user has attempted the predetermined sequence. A procedure can then be implemented to avoid repeating the prior attempt, such as modifying the instructions provided to a user from those provided during the first attempt, with a view to enabling the user to avoid repeating an unsuccessful set of actions.

The evaluation of whether a prior user has attempted the recovery event may include computing a measure of similarity between a real sequence of actions and an ideal sequence of actions. The similarity measure may take into account various factors which cause a sequence of user actions to deviate from an ideal recovery event such as the fact that certain user actions are not recorded, the inclusion of actions which do not form a part of in an ideal recovery event, the repetition of actions, the extent to which certain actions are likely to be related to normal events, unrelated to a recovery event, and the like. Thus, the evaluation of whether a user has attempted an ideal recovery event may be a predictive determination in many instances.

In another aspect, a system for providing instructions to a user of a device includes a display for providing instructions to a user, a processor which retrieves stored data comprising records of user actions with the device, the processor including instructions for identifying from the data a set of actions and instructions for comparing the set of actions with a set of ideal actions which comprise a recovery event and instructions for determining whether a prior user has attempted the recovery event.

As used herein, a "printer" can include any device for rendering an image on print media, such as a copier, laser printer, bookmaking machine, facsimile machine, or a multifunction machine. "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the image forming device and may include text, graphics, pictures, and the like. The operation of applying images to print media, for example, graphics, text, photographs, etc., is generally referred to herein as printing or marking.

As used herein an "action" generally refers to an individual occurrence in which a user interacts with a device by performing a mechanical operation, e.g., opening a door of the printer or manipulating, e.g., pulling out, a component of the printer. In general, actions are the smallest operations which can be recognized by the printer. Actions which may be recorded by the printer include those which are associated with a recovery event and those which are associated with normal operation of the printer.

A "recovery action" refers to any action of a user associated with a printer with the object of correcting a problem or a perceived problem with the printer. Exemplary user recovery actions in troubleshooting include opening access panels to paper trays, removing and/or replacing components such as toner cartridges, adjusting components, removing trapped paper, and the like. The recovery actions may take place in response to a printer request or may be user initiated.

An "event" generally refers a sequence of actions with the general purpose of obtaining a goal.

A "recovery event" generally refers to a sequence of actions with the goal of correcting a problem with the device. An ideal recovery event generally refers to a predefined sequence of ideal actions for correcting a known problem with the device. In general, the predefined sequence includes at least two user actions to be performed in a given order and often at least three such actions. It is to be appreciated that some actions which constitute recovery actions when performed in a recovery event may also be performed in a normal event, which is not a recovery event, such as in replenishing paper supplies.

A "user interaction" refers to the interactions of a user with the device in a troubleshooting attempt. A user interaction may consist of one or more recovery events.

A troubleshooting session may be considered to run from the first detection of a problem by the printer to the resolution of that problem. Where the time at which the problem occurred is not registered by the printer, the troubleshooting session can be considered to run from the first detection by a user or from some arbitrary point in time which may or may not precede the first recovery action. It can consist of one or more recovery events that take place within one or more user interactions.

The actions and the order in which they are performed in a recovery event may be user selected or directed by the printer or an associated or remote support service.

The exemplary embodiment provides a printer help system which leverages knowledge about the past experience of other users interacting with the printer. This helps to prevent or reduce some cases of wasteful repetitions of user actions when troubleshooting problems.

In various aspects, the system and method allow a user who encounters a problem at a printer to be informed if other users have already tried a sequence of actions.

In one aspect, the method includes recording all or selected user actions with a particular printer, in particular the actions linked to troubleshooting sessions, such as actions for removing a paper jam, and maintenance operations, such as periodic change of the toner or of the color cartridges. From these records, information about past troubleshooting experiences of users with the particular printer can be extracted. The extracted information can be used to determine:

a. Whether any users have at least partially followed troubleshooting instructions (a sequence of ideal recovery actions) given by the device and have not fixed the problem.

b. Whether any users have tried recurrent sequences of actions, even if not suggested as a troubleshooting procedure.

The extracted information may be offered to a subsequent user, e.g., as a warning, when giving instructions to be followed to solve the problem. In one aspect, instructions relating to prior user actions are incorporated into instructions produced proactively by the printer in response to a printer malfunction diagnosed by the printer. In another aspect, instructions relating to prior user actions may be provided in the context of user queries when a user is searching for solutions to solve a certain problem of that printer. In another aspect, the method includes informing the user during the troubleshooting if the printer recognizes that the user is performing a sequence of actions already performed (in part) by other users.

FIG. 1 illustrates an exemplary printing system including a printer 10 which is configured with both printer specific hardware and software for performing the exemplary method described herein. The printer 10 includes conventional mechanical components 12, 14, a processor 16, a communication interface (I/O) 18, a memory 20, and a user interface 22, all interconnected by a bus 24.

The communication interface 18 is arranged to couple with an external network, such as local area network (LAN) or wide area network (WAN), and/or the Internet via suitable wired or wireless links, to implement input/output communications between image-forming device 10 and external devices, such as one or more host devices, e.g., work stations 26. Print jobs arrive at the printer from the work stations 26 via the communication interface 18.

The mechanical components 12, 14, herein illustrated as a finisher 12 and a toner cartridge 14, by way of example, are the mechanisms that are used to handle paper, to print documents, to assemble documents, and/or to provide other additional functional characteristics to the printer 10. The mechanical components 12, 14 may include the paper feeding mechanism, the inkjets of an inkjet printer, the laser scanning assembly and revolving drum and other associated mechanisms of a laser printer, finisher components, such as a document collator, a document binder, or a stapler, or any other mechanical component that may be included in a printer 10 to increase its functionality, as well as access panels, such as doors, which provide access to components by a user who is troubleshooting a printer malfunction.

The processor 16 of printer 10 may be embodied in a microprocessor board comprising circuitry. The processor 16 may be a part of the existing circuitry associated with a conventional printer and thus may be configured to perform some or all of the specific functions of printer 10, including control of printer specific hardware and software. Alternatively, the processor 16 may be a separate element and in one embodiment, may be located remote from the mechanical components 12, 14 of the printer, such as in a network server or a workstation 26, e.g., accessible via a web browser.

The instructions for the processor 16 can be instantiated as a computer program product. The computer program product can be a computer readable medium, such as a disk, computer chip, or other electronic storage medium, having a computer readable program code thereon. The computer readable program code includes the instructions executed by the processor 16.

The processor 16 serves as a troubleshooting component which includes a plurality of modules including a fault detection module 30 which detects printer malfunctions, a recording module 32, which records data from the printer comprising user actions with the printer, including data on actions relating to an attempt to repair a printer malfunction (recovery actions), a parser 34 which extracts a sequence of recorded user actions, a comparator 36, which compares the sequence of recorded user actions with one or more stored ideal recovery events each comprising a sequence of ideal user actions in order to compute a measure of similarity between the sequence of recorded user actions and the ideal recovery event, and an instruction module 38, which generates appropriate instructions for the user based on the computed similarity measure, all of which may be interconnected by the bus 24. Reports on the detected user actions may be stored in the memory 20 in the form of RAM, hard disk memory or other data storage medium. The instructions may be provided to the user on a graphical or audible display 40 of the graphical user interface (GUI) 22. The instructions may be provided automatically or in response to a user query. The user interface 22 may include a user input device 42, such as a keyboard and/or a touch screen, whereby a user can interact with the printer, for example, to report a printer malfunction, to interact with an on-line help system, or the like. The GUI 22 may be configured to display alphanumerical characters for conveying visual information to a user. For example, error conditions, status information, print information, and instructions for correcting a printer malfunction or other information can be conveyed using the display 40. An exemplary display 40 is implemented as a liquid crystal display (LCD). The modules 30, 32, 34, 36, 38 of the troubleshooting component 16 are configured to follow a set of instructions 44 either embedded therein, or stored in memory 20.

One or more sensors 50, 52 are arranged to detect information on a user action and communicate a record of the action to the recording module 32. According to one embodiment, sensors 50, 52 may be configured to detect the interfacing of a user with respect to printer hardware 12, 14, such as a sensor which detects the opening of an access door, a manipulation of a user-accessible operational component, or the like. Exemplary sensors 50, 52 are heat, light, motion or pressure sensitive, although other sensor configurations may be utilized to detect the actions of a user.

Repair instructions are available to the printer in an on-line knowledge base 60 which may be stored in memory 20. Printer problems commonly have escalating stages of solutions, either because the same symptoms may be caused by different faults with different solutions or the same fault may have a number of different solutions, some more simple than others. Thus the online knowledge base 60 may include a number of solutions which are generally arranged to be tried in order; from the most simple to the most complex. Each of the solutions may include a sequence of ideal user actions.

The troubleshooting system 16 allows a user to be made aware of solutions which have been tried by other users, or presented with solutions which have not been previously tried from those available in the database 60. By exploiting information on users' mechanical interaction with the printer, users can be prevented from unnecessarily repeating actions which have been unsuccessfully carried out before. This can result in a reduction in wastage of users' time, improved customer satisfaction, reduced down time of the printer, and increased trust in the on-line instructions.

Figure 2A:
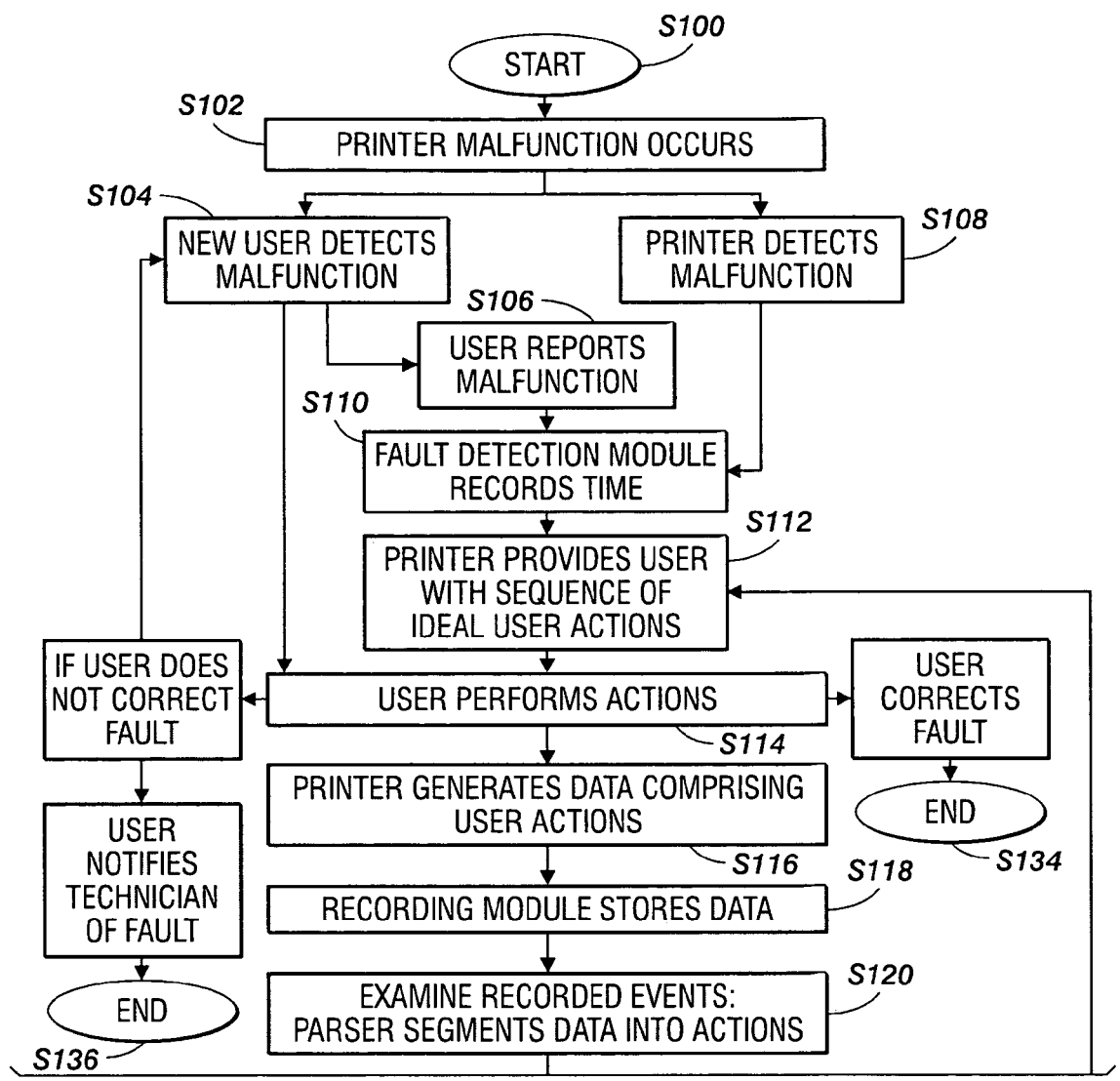
FIG. 2 is a flow diagram of steps in an exemplary method for reducing repetition in a fault correction process.
Figure 2B:
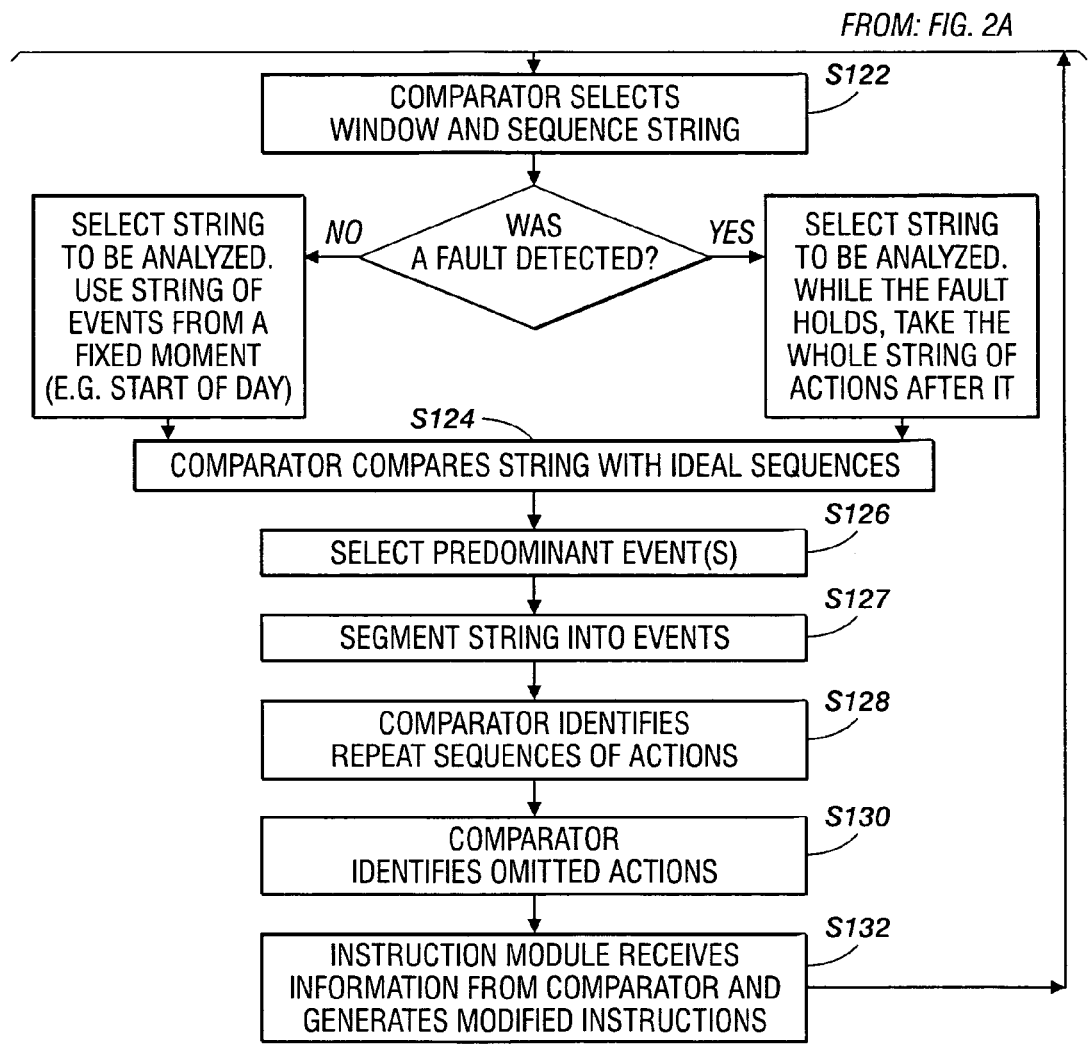

A method of assisting a user of the printer to identify and correct a problem with a printer which may be performed using the system illustrated in FIG. 1 is illustrated in FIG. 2, and may include the following steps. It will be appreciated that the steps need not be performed in the order given and that fewer or additional steps may be employed in the method. The method begins at step S100.

At step S102, a printer malfunction occurs. The malfunction may be recognized by a user of the printer at step S104 who at step S106, may report the malfunction to the printer via the user interface 22 and may provide the printer with symptoms. Or, the user may try to correct the problem without notifying the printer that a problem has been detected. Alternatively or additionally, at step S108, the printer recognizes that a fault has occurred, for example, by receiving notification from one of the printer components 12, 14, via the fault detection module 30. At step S110, the printer, e.g., the fault detection module 30, stores a record of the time at which the malfunction is recognized, if this is available. At step S112, the printer may access the knowledge base and retrieve a set of ideal recovery actions corresponding to a fault which may be responsible for the malfunction and presents these to the user, e.g., provides the user with instructions via the user interface display 40. Where the printer identifies two or more different faults which may be responsible for the malfunction, the printer may present the user with instructions for curing the most likely fault, or the fault which is rectifiable with the easiest recovery actions. At step S114, the user may perform some or all of the set actions provided by the printer. Or, the user may perform another set of actions with the intent of rectifying the problem. If the user does not correct the problem at step S114, the user may leave the printer area without informing subsequent users that any recovery actions have been performed. Steps S104, S106, S110, S112 and S114 may thus be repeated by one or more other users. At step S116, (which may be performed continuously or intermittently prior to and throughout the method) the printer generates data corresponding to actions at the printer, including detectable user actions performed at step S114. At step S118, the data is recorded, e.g., by the recording module 32. At step S120, the processor 16, e.g., the parser 34, periodically examines the data and identifies a sequence of separate elements corresponding to actions. At step S122, the processor e.g., the comparator 36, identifies a time window comprising a candidate string of elements which may include elements corresponding to recovery actions by the user. In the case that the printer identifies that a problem has occurred or a user notifies the printer that a problem has occurred at previous step S110, the window start time may be fixed by the identification or notification time. Where no problem is recognized, an arbitrary window start time is established.

At step S124, the processor, e.g., the comparator 36, compares the identified string of actions with one or more sequences of ideal actions stored in memory 20. This step may involve computing a measure of similarity between a real sequence of actions and an ideal sequence of actions, as described in greater detail below.

At step S126, a predominant event may be identified from the actions recorded within the time window. A predominant event can be a sequence of consecutive user actions which meets a threshold measure of similarity with an ideal recovery event. This step may provide a single candidate predominant event or a few of them. However it does not indicate how many of these have occurred in the given period of time. At step S127, the string is segmented into events. By segmenting the sequence of actions into events, this allows the number of such events to be counted in a subsequent step.

At step S128, the comparator may, from the comparison, identify one or more recovery actions or events which have not resulted in the correction of the fault, e.g., actions which are repeated at least once. This may include counting events by matching similarity against a predominant event. This step may include counting how many similar events have occurred once a predominant event has been detected.

At step S130, the comparator may identify action steps of the ideal sequence which were omitted by a user at step S114. At step S132, the processor may generate a different set of user instructions, taking into account the actions which were not successful in correcting the malfunction. For example, the processor may identify a different set of ideal actions for curing the fault, or another fault corresponding to the symptoms and provide a set of ideal actions related to that fault, and/or may advise the user that a particular user action did not correct the problem. The method returns to step S112. The method may end at step S134 when the user corrects the fault or at step S136, when a user calls a service technician.

As will be appreciated, a precursor step to the method thus described includes the creation of reference strings representing ideal events and storing them in memory 20.

For example, when the user is trying to resolve the problem of paper jam by clearing the paper jam in the finisher interface, one event may comprise the following sequence of actions:

1. Move the finisher on the right-hand side of the printer, to the right, away from the printer.
2. Open the finisher top cover on the finisher interface.
3. Remove the jammed paper. If the paper is torn, make sure to remove any torn pieces of paper inside the printer.
4. Close the finisher top cover.
5. Move the finisher to the left, toward the printer.

From the records 44 of user interaction data captured in the memory 20 of the printer, the troubleshooting component 16 can extract information about past troubleshooting experiences of users with the printer 10. In one embodiment, at step S124 the method includes identifying, from the records 44, candidate limited strings (sequences) of user actions and at step S126, comparing them with sequences of actions that each correspond to an ideal recovery event. The ideal sequences may be stored in troubleshooting tools like a troubleshooting knowledge base 60, e.g., the Xerox On-Line Support Assistant (OSA), an expert system 62 on the printer (e.g. jam removal instructions displayed on the printer screen), or manuals. An example of a recovery event in the troubleshooting knowledge base is the set of actions listed above for removing a paper jam. These tools describe "ideal sequences" of actions, that is, predefined sequences of actions that are logically chained to obtain a certain result. In general, they have a precise order, actions are clearly distinct from one another, and the start and the end of the problem can be easily recognized.

There are a number of approximations and sources of noise in the user interaction data recorded by the recording module 32, since not all human actions and faults are detectable. For example, a user who shakes a toner cartridge or the presence of white lines on the paper may not be detected by the components 30, 32 of the troubleshooting component 16. Moreover, actual troubleshooting events are not necessarily very close to ideal sequences. Several types of discrepancy can occur including:

Incomplete events: an event is started but not concluded.

Redundant events: an event includes a repetition of one or more actions.

Modified events: an event where the order of some of the actions has been changed.

Noisy events: an event which contains one or more actions that are not part of an ideal sequence.

The comparator 36 compares the detected string of actions with one or more ideal sequences of actions, which may be stored in the printer internal knowledge base 60 or accessed from an external knowledge base 62. In order to match ideal sequences with real sequences, a metric is defined over the sequences to be compared which accounts, at least in part, for discrepancies of the types illustrated above. Specifically, the exemplary method at step S126 includes computing a measure of similarity between a real sequence of actions and an ideal sequence of actions.

In one embodiment, a sequence kernel, frequently also referred to as string kernel is utilized by the comparator 36. String kernels provide the ability to recognize similarities among strings even when the symbols are not in perfect sequence. They permit the detection of strings that represent events which are incomplete, modified, redundant or noisy as in the interaction data typical in a printer. A further discussion of string kernels is provided by Lodhi, et al., "Text Classification Using the String Kernel," in Advances in Neural Information Processing Systems 13 (MIT Press, 2001) and in Cancedda, et al. "Word-Sequence Kernels," Journal of Machine Learning Research, 3: pp. 1059-1082 (February 2003) (hereinafter "Cancedda").

The string kernel computes similarity as the number of occurrences of subsequences (in this case, sequences of actions) shared by two sequences. The subsequences may be contiguous or non-contiguous. A maximum length (number of actions) n of the subsequences to be compared is set before computing the string kernel. In general, n is at least two, and for printers may typically be from about three to about 6. The value of n may be higher in cases where typical ideal sequences include a large number of individual actions. Non contiguous occurrences are penalized according to the size of the gaps they contain. The string kernel takes the two sequences and returns a number.

For example, let $\Sigma$ be a finite alphabet of actions, and let $s = s_1 s_2 \ldots s_{|s|}$ be a first sequence of actions over such alphabet (such as a string of user actions with the device). Let $i=[i_1, i_2, \ldots, i_n]$, with $i_1 < i_2 < \ldots < i_n \leq i_{|s|}$, be a subset of the indices in s (i.e., the positions of a particular subsequence of actions). Let s[i] represent the (possibly non-contiguous) subsequence $s_{i1} s_{i2} \ldots s_{in}$. Also, let l(i) be the expression $i_n - i_1 + 1$, i.e., the width of the window in s spanned by s[i]. Similarly, let $r = r_1 r_2 \ldots r_{|r|}$ be a second sequence over the alphabet (such as an ideal sequence of user actions).

The sequence kernel $K_n(s,r)$ of the two strings s and r over $\Sigma$ can be defined as:

$$K_n(s, t) = \sum_{u \in \Sigma^n} \sum_{i: u = s[i]} \sum_{j: u = t[j]} \lambda^{l(i) + l(j)} \quad \text{(Eqn. 1)}$$

where n, the maximum subsequence length, is a fixed positive integer and $\lambda$ is a gap penalty factor. $\lambda$ is a real number between 0 and 1 indicating the decay factor for each gap in subsequence occurrences. As noted above, n may be, for example, 3, 4, 5, or 6 in the printer example. The decay factor may be selected by trial and error to provide appropriate weighting for the presence of gaps. Where there are naturally a large number of gaps in a string of user actions (because, for example, only a portion of the user actions are sensed by the printer), the gap penalty factor $\lambda$ may be lower (closer to 0).

Computing such a kernel amounts to performing an inner product in a feature space with one dimension for each subsequence $u \in \Sigma^n$, with feature mapping given by:

$$\phi_u(s) = \sum_{i: u = s[i]} \lambda^{l(i)} \quad \text{(Eqn. 2)}$$

Further details on how the string kernel technique may be applied to sequences of user actions in a troubleshooting operation are provided below.

Another approach for measuring similarity between a sequence of real actions and a sequence of ideal actions is to use a basic edit distance. This is the minimum number of symbol replacement, deletion and insertion operations that are required to transform one of the two sequences, such as the ideal sequence of actions, into the other, e.g., the real sequence of actions.

In the present case, it is useful to match individual ideal sequences against a real sequence which may contain several events. However, when comparing a single ideal sequence with a real sequence encoding multiple noisy events, the edit distance does not take into account the presence of multiple noisy occurrences of the ideal sequence in the real sequence. In other words, the edit distance may detect that a certain recovery event (an ideal sequence of actions) has been attempted, but it would be unable to estimate how many times it was attempted.

As noted above, a precursor to the exemplary method involves the creation of reference strings representing ideal troubleshooting events in the same alphabet as is utilized by the parser for identifying real events. A first step in the creation of reference strings includes a modelling activity: recovery events are represented as non ambiguous sequences of individual actions. This in turn involves two subtasks: the identification of an alphabet of actions, by which the actions can be described, and the encoding of events as sequences over this alphabet. These subtasks may be intertwined. Two sources from which the information for performing these subtasks can be gathered are sequences of recovery actions proposed by the printer to the user when a fault is detected and the troubleshooting knowledge base.

Several methods for modelling the data are contemplated. In a first method, the ideal sequences of recovery events of the kind described above can be manually coded by analysing the content. This is feasible, although time consuming, in the domain of printer malfunctions, since sequences may be in the order of hundreds of actions, as is evident from the content of an online knowledge base. In an alternative embodiment, an expert encoding the events is supported by a structural and linguistic analysis of the instructions describing recovery procedures. The linguistic analysis may be provided by a processing module with instructions for numbering of the steps or for the identification of verbs in the imperative form, e.g. 'move the finisher to the left' or 'open tray 1.' The thus formulated sequence strings for a series of typical recovery events may be stored in the printer memory, to be retrieved when a printer malfunction occurs.

At the time of a printer malfunction, the method includes extracting information from recorded data, which may include the selection of sequences to be analysed and the identification of predominant events (step S126).

It will be appreciated that actions may occur continuously at the printer, only a few of which relate to troubleshooting events. For example, documents are printed, a fault occurs, a door is opened. All of these actions may be detected by the recording module 32 of the troubleshooting processor. In one embodiment, on a regular or intermittent basis, typically during printer idle times, recorded actions are examined and information extracted therefrom by the parser.

The next step is to detect sequences of actions which constitute an event (step S126). This includes the identification of sub-streams ("windows") where one or more events could have occurred, by segmentation of the continuous stream of information coming from the parser of the printer. This differentiation between events may utilize several automated strategies for clustering a sequence of actions and labelling them with a common event tag. The sequences of actions which are of interest include human interventions on the printer. While most faults and human mechanical interventions are detected, some may not be sensed by the printer. These actions can be considered as "holes" in the actual event. Moreover, not all the technical problems which a printer may suffer result in a fault detected by the printer. In general, there are minor technical deficiencies that are not sensed by the printer. These include print quality problems, which while not blocking use, could trigger the user to attempt some troubleshooting actions.

It should also be noted that the actions that constitute a recovery event typically occur within a time interval that is significantly shorter than the intervals between actions that belong to different events. This time proximity can be exploited to cluster actions into recovery events. Additionally, if the identity of the users performing the actions has been captured this information may also be used for clustering actions into events by associating them to users. The user information may be captured, for example, when a user enters his personal code before making a copy or when a print job arrives at the printer from a user's workstation with a file header which provides user information.

Figure 3:
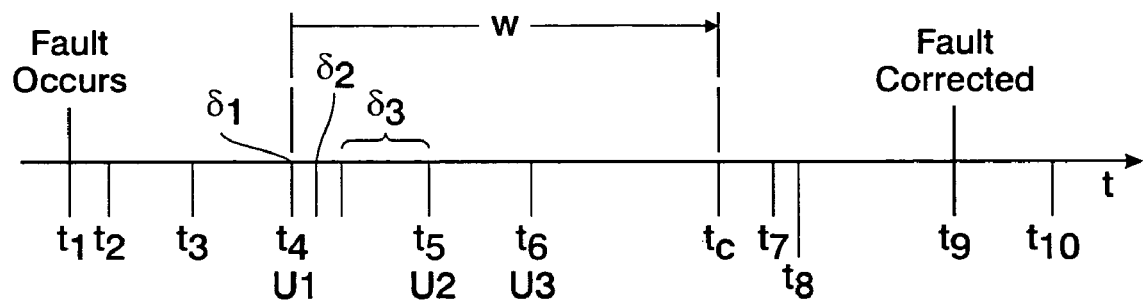
FIG. 3 illustrates a timeline showing selection of a window for examining printer data in accordance with a first embodiment of the exemplary method.

Two methods are proposed for detecting a candidate window W containing one or more events (Step S122). In the first, a fault is detected by the printer (step S108 or Step S106) and some instructions are presented to the user (step S112). This scenario is illustrated in the time line shown in FIG. 3, where t represents time. At time $t_1$, a fault occurs. At time $t_2$, the printer recognizes the fault has occurred. The printer may be configured for detecting a number of faults and automatically suggesting troubleshooting actions, for example when it detects a paper jam. At $t_3$, the printer displays an error message. Following the message of a fault, one or more users may perform actions in order to resolve the problem according to the instructions they are provided. For example, at time $t_4$, a first user U1 begins a series of actions. If this does not bring the printer to a non-faulty state then the user may give up and other users U2, and U3 could repeat the process at times $t_5$ and $t_6$, respectively. At time $t_8$, the printer may provide a new set of instructions following identification of repeated, unsuccessful actions by the users at time $t_7$. At time $t_8$, another user U4 (or one of the prior users U1, U2, U3) begins to correct the fault. At time $t_9$, the fault is corrected. At time $t_{10}$, the printer detects that the fault has been corrected, and no longer displays the error message.

The method in this case may rely on the fault information from the printer to restrict the window W of actions to consider. In the simplest case, a number of users carry out detectable actions which may be equivalent to ideal action steps stored in the knowledge base, thus making each user interaction a sort of repetition of a sequence of events. The start $t_4$ of the troubleshooting session can be considered as the occurring when a first user U1 attempts to correct a fault already detected by the printer and ends at $t_{10}$ when the fault is no longer detected by the printer. The reference window W of considered actions is therefore periodically computed at fixed intervals or at intermittent time intervals (e.g. during idle periods of the printer when no user is interacting with it) and proceeds from the time of the fault detection $t_2$ until the current moment $t_c$ of computation. The string of actions determined in this way is the string of actions that is then used to detect any recurrent events within it.

In one embodiment, using the string kernel's similarity measurement technique, the logged sequence of actions is first matched against an ideal action sequence, which is a sequence of actions associated to a given fault. If this measure does not reach a preselected threshold of similarity, the string is then compared with a larger set of ideal sequences of actions, such as all the sequences of ideal actions available in the model. A detailed example is provided below.

Figure 4:
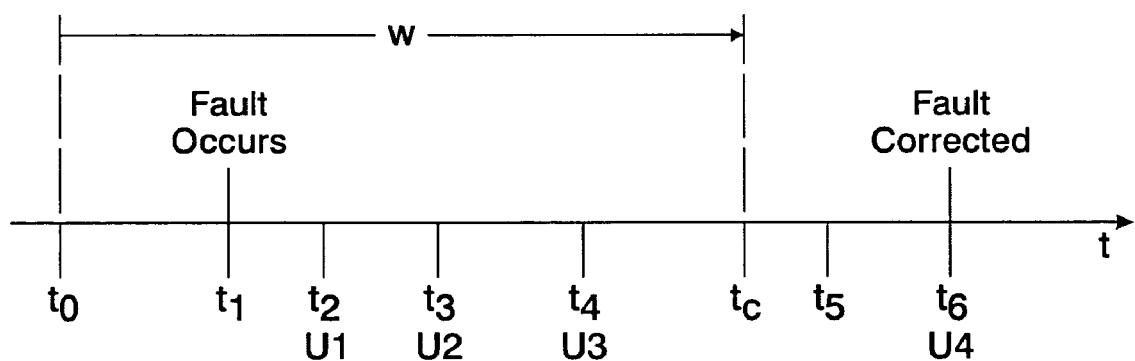
FIG. 4 illustrates a timeline showing selection of a window for examining printer data in accordance with a second embodiment of the exemplary method.

In a second scenario, illustrated by the timeline in FIG. 4, the printer malfunctions at time $t_1$ as before, but no fault is detected by the printer. This is the case, for example, with degraded print or copy quality. At times $t_2, t_3, t_4$, users U1, U2, and U3, attempt, unsuccessfully, to correct the problem. At time $t_5$, the computation of the string kernel indicates that at least one prior user has attempted a predefined ideal sequence. At time $t_6$, the printer provides a warning message that a sequence has been attempted by one or more prior users and may also provide a new set of instructions for correcting the problem which the string kernel suggests has been attempted by the prior user(s). At time $t_6$, a new user U4 (or one of the prior users) sees the warning message/instructions and uses a different sequence of actions to correct the problem.

In this scenario, no precise information on where to start searching for repeated events in the logged string is available. A solution is to consider a meaningful reference time in the past, for example the beginning of the working day $t_0$, as shown in FIG. 4 (or a selected number of hours prior to the current time). The segmented string will therefore contain all actions from the beginning of, e.g., the current day. Since no fault has been identified in this case, there is no indication of what the ideal sequence could be, so the string of actions will be directly compared with the reference set of all ideal sequences. If a user action is repeated, the resulting one or more events that will exceed a given threshold of similarity will then be the ones looked for counting the actual occurrences of them in the next step.

A further step (step S128) is to detect the repeated execution of a sequence of actions. It will be appreciated that there may be sequences of actions performed in the normal course of operations (e.g., to load paper trays) that might be similar to recovery events. Two possible solutions to this problem are contemplated, which can be combined or used independently. The first solution consists of modelling explicitly not only recovery events but also events corresponding to normal, non-fault operations. The actual sequence of actions can then be matched against both fault and non-fault ideal sequences, and a warning message be issued only in case a subsequence matching a recovery event is not contained in a subsequence matching a normal operation sequence with a higher score (as computed, for example, by the string kernel).

Moreover, if a sufficiently large number of action sequences annotated with fault and non-fault events is available, normal operation sequences can be acquired through learning (as this reduces to a standard binary classification problem over sequences).

A second method for differentiating recovery actions from normal operation actions consists in assigning different weights to different action/symbols, namely giving more importance to those actions that discriminate better between a fault recovery event and a normal operation event. A generalization of the sequence kernel used according to the method in this case can be represented as follows:

$$K_n(s,t) = \sum_{u \in \Sigma^n} \sum_{i:s[i]=u} \sum_{j:t[j]=u} \prod_{l=1}^{n} \lambda_{m,u_l}^2 \prod_{i_1 < p < i_n, p \notin i} \lambda_{g,s_p} \prod_{j_1 < q < j_n, q \notin j} \lambda_{g,t_q} \quad (\text{Eqn. 3})$$

Weighting schemes of this type are described, for example, in Cancedda, et al. In the original string kernel formulation (Eqn. 1) there is a single decay factor $\lambda$. This factor is used to penalize in a uniform way both matching symbols and symbols appearing in gaps. Since all matching subsequences have the same number of matching symbols (namely 2n, i.e. n in each sequence), the overall effect is to penalize by $\lambda$ all symbols appearing in gaps. Moreover, no difference is made according to which specific symbol is matched or skipped.

In Eqn. 3, there are two sets of decay factors, $\lambda_g$ and $\lambda_m$, the first of which is used to penalize gaps and the second used to score matches. Each decay factor set includes a value for each symbol (action) in the alphabet. The match score $\lambda_{m,\sigma}$ for a symbol a can then be set to a value based on the discriminating power of $\sigma$. If statistics on the number of occurrences of $\sigma$ in fault and non-fault events are available, an estimate of the conditional probability that an action belongs to a recovery event given that it contains an occurrence of a can conveniently be used as $\lambda_{m,\sigma}$.

Assume, for example, that the alphabet contains a symbol 'RPJ' for "Remove Paper Jam". The decay factor for matches can be set:

$$\lambda_{m,RPJ} = \hat{p}(\text{fault}|RPJ) = \frac{c(\text{fault}, RPJ) + 1}{c(RPJ) + 2} \quad (\text{Eqn. 4})$$

where $p(\text{fault}|\sigma)$ is the probability of an action being related to a fault, c(RPJ) is the number of times that RPJ appears in a training set of real user actions which includes both recovery and normal actions, c(fault, RPJ) is the number of times RPJ appears in the corpus of stored ideal recovery sequences, and a simple Laplace smoothing is applied. In the likely event that almost all occurrences of RPJ belong to events tagged as 'fault', $\lambda_{m,RPJ}$ will receive a large value, close to 1.

Conversely, the decay score $\lambda g,\sigma$ will be assigned a value inversely proportional to $p(\text{fault}|\sigma)$ in order to penalize skipping a highly relevant symbol. In other words, if two sequences differ by an occurrence of 'RPJ', this is penalized more than if two sequences differ for an occurrence of, say, 'OT1' (for "Open Tray 1"), which occurs frequently in normal (non-fault) sequences of actions. A simple approach is to set $\lambda g,\sigma = 1 - \lambda m,\sigma$.

A further step (step S128) is to count how many similar events have occurred once a predominant event has been detected. The previous step (S126) provides a candidate predominant event or a few of them. However it does not indicate how many of these have occurred in the given period of time. Thus, the sequence of actions is segmented into events (step S127), in order to proceed to such enumeration.

In one embodiment, a simple heuristic to segment the sequence into events consists of looking at the elapsed time between actions. In general, it can be assumed that actions contained in a same event are closer to one another than actions belonging to different ones. For example in FIG. 3, $\delta_1$ and $\delta_2$ (i.e. the time interval among two user actions belonging to the same event) are smaller than $\delta_3$, representing the time between the last action from user U1 and the first action of user U2.

Once the actual events are detected as clusters of actions, they can then be again measured against the candidate ideal event selected in the previous step.

An alternative to estimate the number of occurrences of each event consists in performing a partial normalization of the value of the sequence kernel between the actual action sequence and the ideal sequences. The value of the sequence kernel, as presently defined, depends on the length of the matched sequences: the longer they are, the larger the chances that they will share subsequences and the higher the value of the kernel. In many applications it is appropriate to normalize the kernel and make it independent of the sequence length. This is usually done by replacing K(s,t) with:

$$K'(s,t) = K(s,t)/\text{sqrt}(K(s,s)*K(t,t)) \quad (\text{Eqn. 5})$$

With this normalization, the value of K' has a value of between 0 and 1. However, when estimating the number of occurrences of an ideal sequence in the reference sequence, a different, partial, normalization is more convenient. By taking:

$$K''(s,t) = K(s,t)/K(t,t) \quad (\text{Eqn. 6})$$

where t is an ideal sequence, for K'', a value proportional to the number of occurrences of r in s is obtained. Rather than providing an exact indication of the number of occurrences, this estimate can usefully complement the heuristics based on inter-event and intra-event time intervals mentioned above. It will be appreciated that this estimate is not possible if a simple edit distance is used instead of the string kernel.

Identifying the length n of the subsequences to be matched can be difficult. If the value chosen is too large, then only very few subsequences will match and pairwise similarity will always be close to 0. If it is too small, on the contrary, important information on the respective ordering of symbols may be lost, and pairwise similarity will be overestimated. The most common way to tackle this problem consists in actually taking as value a linear combination of the (normalized or partially normalized) values of the kernels for all subsequence lengths up to a value n:

$$\overline{K}_n(s, t) = \sum_{i=1}^{n} \mu^{n-i} K'_i(s, t) \quad \text{(Eqn. 6)}$$

with μ controlling the relative importance given to subsequences of increasing lengths. Information on recurrent events on the printer as extracted in the steps described above can be provided to users when they reach the printer, e.g., when they first find out that a problem has occurred, or during their intervention on the printer, e.g., while the user is trying to fix a problem.

If a fault has occurred and the troubleshooting system 16 is able to detect that a sequence of actions similar to the suggested procedure has been attempted more than a given number of times and more than others this may be indicated to the user as an estimation that there is another problem that has to be solved first or that the procedure has not been followed properly by other users.

If no fault has been detected but the troubleshooting system 16 is still able to detect that a sequence of actions close to an ideal sequence has been attempted more than a given number of times, and more than others, this may be indicated to the user as an estimation that there is a problem that other users have already tried to fix.

If a fault has occurred and the troubleshooting system 16 does not detect outstanding recurrent sequences of actions it may continue to attempt to detect recurrent events while the user is performing actions on the printer using candidate events prepared during idle times.

Without intending to limit the scope of the exemplary embodiment, the following examples illustrate application of the method to changing the toner and to clearing a paper jam.

EXAMPLE 1

As a first example, an illustration of how the sequence kernels are applied will now be described with reference to 'changing the toner'. Changing the toner may be performed in response to a message on the printer or to an image quality problem. This example has been used for simplicity, being the shortest troubleshooting sequence. While being a simple and simplified example, the "changing the toner" event is nonetheless applicable since it has been observed that different users changed the toner several times in the hope of addressing a print quality problem and without knowing that other users had already tried that many times. It should be remembered that the users following the exact sequence of actions, such as replacing the toner or removing a paper jam, may still not have solved the problem. This is one example of a process that the troubleshooting system is readily able to warn users against, i.e. doing that sequence of action does not solve the problem, as, for example, ten users have already tried the same sequence of actions. This example, then, is used to illustrate all the possible events that can be associated with this error and the principle of how the sequence kernels are applied.

The Alphabet: An alphabet is defined so as to be able to describe the actions taken at the printer. This is a simplified example where most of the remaining actions are reduced to the Generic Action (GA). It will be appreciated that in an actual system, GA will be replaced with a variety of different symbols.

OFD=Open Front Door
CFD=Close Front door
INT=Insert New Toner
ROT=Remove Old Toner
GA=Generic Action

Σ={OFD, CFD, INT, ROT, GA}

An example of a reference string: With respect to the example which consists of replacing the toner cartridge, the reference sequence of actions (ideal sequence) may be:

r=OFD ROT INT CFD

When dealing with this problem, several different cases of events can be envisaged. The first one exhibits the exact sequence of actions. However there could be users who produce a noisy event, e.g. incomplete—if they do not succeed—or redundant—if they mix actions that are not really required. The case of a modified event is not applicable in this case as there are no successful permutations of these actions. An example of modified event is shown in Example 3. The exact sequence can be represented by:

o=OFD ROT INT CFD

An incomplete sequence can be represented by:

o=GA GA OFD ROT CFD GA GA

In the above example, the user has omitted the step INT. A redundant sequence can be represented by:

o=GA OFD ROT CFD OFD INT CFD GA

In the above example, the user has repeated the OFD step and added a CFD step, out of order. A noisy sequence may be represented by:

o=GA OFD GA GA ROT INT CFD GA

In the above example, the user has added different steps from those prescribed. Other sequence s may have no relation to the ideal sequence, such as:

o=GA GA GA GA GA GA GA GA

The first step of the method is to measure which event is most recurrent in a given logged string. Assume that two users had already tried to replace the toner. The logged string could be as follows:

GA GA OFD ROT INT CFD GA GA GA GA OFD ROT CFD GA GA

A measure against the set of ideal sequences would identify the string 'OFD ROT INT CFD' as the most likely candidate. At this stage, assume that segmentation based on time intervals between different actions (Step S127) returns the strings:

o1: GA OFD ROT INT CFD
o2: OFD ROT CFD
o3: GA GA GA

The value of the non-normalized kernel K (Eqn. 1) between each such observed sequence and the ideal sequence, assuming parameters λ=0.5 and n=3 are listed in the first row of TABLE 1, as follows:

TABLE 1

|  | o1 | o2 | o3 |
| --- | --- | --- | --- |
| K | 0.039062 | 0.007812 | 0 |
| K' | 0.772667 | 0.316228 | 0 |
| $K_n$ | 1.423016 | 0.819716 | 0 |

By way of illustration, the value of the first cell may be computed by considering the following matching subsequences in TABLE 2:

TABLE 2

| U | $\phi_u(i)$ | $\phi_u(o1)$ |
|---|---|---|
| OFD ROT INT | 0.125 ($\lambda^3$) | 0.125 |
| OFD ROT CFD | 0.0625 ($\lambda^4$) | 0.0625 |
| OFD INT CFD | 0.0625 | 0.0625 |
| ROT INT CFD | 0.125 | 0.125 |

$K_3$(OFD ROT INT CFD, GA OFD ROT INT CFD) = $\lambda^3\lambda^3 + \lambda^4\lambda^4 + \lambda^4\lambda^4 + \lambda^3\lambda^3$ = 0.015625 + 0.00390625 + 0.00390625 + 0.015625 = 0.0390625

In order to have similarity measured independently of sequence length, the normalized version (Eqn. 5) can be used, which ensures that the value is always between 0 and 1. After normalization, kernel values K' are as shown in the second row of TABLE 1.

Taking a linear combination of the normalized or partially normalized values of the kernels for all subsequence lengths up to a value n using Eqn. 6 with μ controlling the relative importance given to subsequences of increasing lengths and assuming μ=0.5 (the maximum value is now 1.75), the values of $K_n$ obtained are as shown in the third row of TABLE 1.

EXAMPLE 2

This example applies the method to the clearing of a paper jam. In this case, the Alphabet may include the following symbols:
SFO=Slide Finisher Out
OFTC=Open Finisher Top Cover
RJP=Remove Jammed Paper
CFTC=Close Finisher Top Cover
SFB=Slide Finisher Back
OT1=Open Tray 1
CT1=Close Tray 1
GA=Generic Action
Σ={SFO, SFB, OFTC, CFTC, RJP, OT1, CT1, GA}

For removing the jam in the finisher area, the reference sequence of actions (ideal sequence) is:
r=SFO, OFTC, RJP, CFTC, SFB The similarity measures for each case of a detected event are measured.

For the case of an exact match: o1=SFO, OFTC, RJP, CFTC, SFB, n=3 Values of $\phi_u(s)$ and $\phi_u(t)$ are given in TABLE 3 below:

TABLE 3

| U | $\phi_u(s)$ | $\phi_u(t)$ |
|---|---|---|
| SFO, OFTC, RJP, | $\lambda^3$ | $\lambda^3$ |
| SFO, OFTC, CFTC | $\lambda^4$ | $\lambda^4$ |
| SFO, OFTC, SFB | $\lambda^5$ | $\lambda^5$ |
| SFO, RJP, CFTC | $\lambda^4$ | $\lambda^4$ |
| SFO, RJP, SFB | $\lambda^5$ | $\lambda^5$ |
| SFO, CFTC, SFB | $\lambda^5$ | $\lambda^5$ |
| OFTC, RJP, CFTC | $\lambda^3$ | $\lambda^3$ |
| OFTC, RJP, SFB | $\lambda^4$ | $\lambda^4$ |
| OFTC, CFTC, SFB | $\lambda^4$ | $\lambda^4$ |
| RJP, CFTC, SFB | $\lambda^3$ | $\lambda^3$ |

TABLE 3-continued

| U | $\phi_u(s)$ | $\phi_u(t)$ |
|---|---|---|

$K_3$(SFO OFTC RJP CFTC SFB, SFO OFTC RJP CFTC SFB) = $\lambda^3\lambda^3 + \lambda^4\lambda^4 + \lambda^5\lambda^5 + \lambda^4\lambda^4 + \lambda^5\lambda^5 + \lambda^5\lambda^5 + \lambda^3\lambda^3 + \lambda^4\lambda^4 + \lambda^4\lambda^4 + \lambda^3\lambda^3$ For an incomplete sequence, such as: o2=GA, GA, SFO, OFTC, CFTC, GA n=3

Values of $\phi_u(s)$ and $\phi_u(t)$ are given in TABLE 4 below:

TABLE 4

| U | $\phi_u(s)$ | $\phi_u(t)$ |
|---|---|---|
| SFO, OFTC, RJP | $\lambda_3$ | 0 |
| SFO, OFTC, CFTC | $\lambda_4$ | $\lambda_3$ |
| SFO, OFTC, SFB | $\lambda_5$ | 0 |
| SFO, RJP, CFTC | $\lambda_4$ | 0 |
| SFO, RJP, SFB | $\lambda_5$ | 0 |
| SFO, CFTC, SFB | $\lambda_5$ | 0 |
| OFTC, RJP, CFTC | $\lambda_3$ | 0 |
| OFTC, RJP, SFB | $\lambda_4$ | 0 |
| OFTC, CFTC, SFB | $\lambda_4$ | 0 |
| RJP, CFTC, SFB | $\lambda_3$ | 0 |

$K_3$(SFO OFTC RJP CFTC SFB, SFO OFTC CFTC) = $\lambda^4\lambda^3$

Other examples of incomplete sequences may be:
o3=OFTC, CFTC, SFB
o4=SFO, OFTC, SFB
o5=GA, GA, SFO, OFTC, CFTC, OFTC, RJP, CFTC, SFB, GA
o6=SFO, SFB, SFO, OFTC, RJP, CFTC, SFB
An example of a noisy sequence may be:
o7=SFO, OFTC, OT1, CT1, RJP, CFTC, SFB Non-normalized kernel values K (Eqn. 1) with n=3 and λ=0.5 and normalized values K' are given in TABLE 5, together with values obtained by a linear combination $K_n$ of different subsequence lengths with μ=0.5 (Eqn. 6).

TABLE 5

| Kernel | o1 | o2 | o3 | o4 | o5 | o6 | o7 |
|---|---|---|---|---|---|---|---|
| K | 0.065430 | 0.007812 | 0.007812 | 0.003906 | 0.065674 | 0.049805 | 0.028076 |
| K' | 1 | 0.088486 | 0.244339 | 0.122169 | 0.476697 | 0.501571 | 0.316298 |
| $K_n$ | 1.75 | 0.315813 | 0.682923 | 0.513650 | 0.989104 | 1.065886 | 0.828646 |

EXAMPLE 3

A Modified Event

For the action of Clear Duplex Module, Upper Left Door, Remove and Reinstall the Copy/Print Cartridge, the Alphabet may include:
LDM—lower duplex module
LBT—lower bypass tray
OB—open baffle
RJP—remove jammed paper
CB—close baffle
OULD—open upper left door
RJP—remove jammed paper
OLFC—open left front cover RPC—remove print cartridge
RIPC—reinstall print cartridge
CLFC—close left front cover
CULD—close upper left door
CDM—close duplex module
GA=generic action

Σ={LDM, CDM, LBT, OB, CB, RJP, OLFC, CLFC,
RPC, RIPC, OULD, CULD, GA}

Exact String:

r=LDM, LBT, OB, RJP, CB, OULD, RJP, OLFC,
RPC, RIPC, CLFC, CULD, CDM

Modified String Examples:

o1=LDM, LBT, OULD, RJP, OLFC, RPC, RIPC,
CLFC, CULD, OB, RJP, CB, CDM o2=LDM, LBT, OB, RJP, CB, OULD, OLFC, RPC,
RIPC, CLFC, RJP, CULD, CDM

Table 6 shows Non-normalized kernel values (Eqn. 1), with n=3 and λ=0.5, normalized values (Eqn. 4), and linear combination of different subsequence lengths with μ=0.5.

TABLE 6

| String Kernel Values | R | o1 | o2 |
|---|---|---|---|
| K | 0.300663 | 0.155302 | 0.208734 |
| K' | 1 | 0.528086 | 0.709776 |
| $K_n$ | 1.75 | 1.150438 | 1.374164 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for assisting a current user to correct a problem with a device which a prior user has already attempted to correct, comprising:
   extracting, from records comprising prior user actions on a device, a string of user actions on the device, wherein the device is a printer;
   comparing the string of user actions with at least one predetermined sequence of user actions for correction of a predefined problem with the device;
   based on the comparison, evaluating whether at least one prior user has attempted the predetermined sequence; and
   implementing a procedure to avoid the current user repeating the prior attempt of the prior user.

2. The method of claim 1, wherein the comparing of the string of user actions with the predetermined sequence of actions includes computing a measure of similarity between the string of user actions and the predetermined sequence.

3. A method for assisting a current user to avoid repeating actions of a prior user to correct a problem with a device, comprising:
   extracting, from records comprising user actions on a device, a string of user actions on the device, wherein the device is a printer;
   comparing the string of user actions with at least one predetermined sequence of user actions for correction of a predefined problem with the device, the comparing including computing a measure of similarity between the string of user actions and the predetermined sequence, the computing of the measure of similarity including:
   computing a string kernel value including computing a number of occurrences of subsequences of actions shared by the string of user actions and the predetermined sequence;
   based on the comparison, evaluating whether at least one prior user has attempted the predetermined sequence; and
   where from the evaluation, at least one prior user has attempted the predetermined sequence, implementing a procedure to avoid the current user repeating the prior attempt.

4. The method of claim 3, wherein the computing of the string kernel includes weighting user actions in the string of user actions according to the likelihood of their occurrence in correction of a problem relative to the likelihood of their occurrence in normal events.

5. The method of claim 3, wherein the computing of the string kernel includes comparing subsequences of the string of user actions and subsequences of the predetermined sequence and penalizing gaps in the subsequences of the string of user actions.

6. The method of claim 1, further comprising comparing the string of user actions with at least one predetermined sequence of user actions associated with a normal user interaction with the device to eliminate from the evaluation, strings of user actions which are more likely to be associated with normal interactions than with correction of a predefined problem with the device.

7. The method of claim 1, wherein the implementation of the procedure includes interacting with the user.

8. The method of claim 7, wherein the interaction with a user includes providing a modified sequence of user actions for correcting the predetermined problem.

9. The method of claim 8, wherein the modified sequence of user actions differ from those provided during recording of the prior attempt.

10. The method of claim 7, wherein the interaction with a user includes advising the user of the prior attempt.

11. The method of claim 1, wherein implementation of a procedure includes providing a user with instructions which enable the user to avoid repeating a previously performed sequence of user actions.

12. The method of claim 1, wherein the extraction of a string of user actions on the device comprises coding the recorded user actions with symbols from a finite alphabet, the sequence of ideal actions being expressed as symbols from the finite alphabet.

13. The method of claim 1, further comprising:
   identifying a time window from which the string of user actions is extracted.

14. The method of claim 13, wherein the extracting of the string of user actions on the device includes identifying a plurality of strings of user actions which are sufficiently spaced in time to be considered as separate user interactions.

15. The method of claim 1, wherein the string of user actions includes user actions recorded subsequent to a detection of a fault by the device.

16. The method of claim 1, wherein the string of user actions includes user actions recorded subsequent to a predetermined reference time.

17. The method of claim 1, wherein the extracting, comparing, and evaluating and implementing are executed by a processor.

18. The method of claim 1, wherein the records further comprises device information, and wherein the device information comprises device operational and fault status information generated over a period of time.

19. A system for assisting a current user in avoiding repetition of prior user's attempts to correct a problem with a device comprising:
a user interface for interacting with a user;
memory which stores instructions for identifying a string of actions on a device, instructions for comparing the string of actions with a predetermined sequence of actions for correcting a problem with the device, and instructions for interacting with a current user, based on the comparison, to alert the current user that a prior user has attempted to correct the problem with the device, to assist the user to avoid repetition of the prior user's attempt to correct the problem with the device, wherein the device is a printer;
a processor which retrieves records comprising user actions on the device, the processor executing the instructions for identifying a string of actions, the instructions for comparing the string of actions with at least one predetermined sequence of actions for correcting a problem, and the instructions for interacting with the user.

20. The system of claim 19, wherein the instructions for comparing the string of actions with a predetermined sequence of actions comprise instructions for computing at least one of:
a string kernel value; and
a minimum edit distance between the string of user actions and the predetermined sequence of actions.

21. A computer readable medium comprising instructions, which when executed on a processor;
extract, from records comprising user actions on a device, a string of user actions on the device wherein the device is a printer;
compare the string of user actions with at least one predetermined sequence of user actions for correction of a predefined problem with the device;
based on the comparison, evaluate whether at least one prior user has attempted the predetermined sequence; and
implement a procedure for avoiding a repeat of the prior attempt by a current user of the device.

22. A method for forming a system for assisting a user to correct a problem with a device, comprising:
assigning elements of a finite alphabet to user actions associated with a device, the actions including actions taken to correct problems with the device, wherein the device is a printer;
for each of a plurality of ideal sequences of user actions for correcting problems with the device, identifying a sequence of elements corresponding to the actions and storing the sequences in memory;
providing instructions for comparing a string of user actions on the device expressed in the finite alphabet with at least one of the stored sequences to compute a measure of similarity for use as an indicator of whether a prior user has attempted the stored sequence, the computing of the measure of similarity including computing, for each of the ideal sequences, a sequence kernel including computing a number of occurrences of subsequences of user actions shared by the string of user actions and the ideal sequence providing instructions for alerting the current user to assist the current user in avoiding repetition of the prior user's attempt to correct the problem with the device.

23. A method for assisting a user to avoid repeating prior user actions to correct a problem with a device, comprising:
determining whether a prior user has attempted a predetermined sequence for correcting a problem with the device including:
extracting, from records comprising user actions on a device, a string of user actions on the device, and
comparing the string of user actions with at least one predetermined sequence of user actions for correction of a predefined problem with the device, the comparing including computing a measure of similarity between the string of user actions and the predetermined sequence, including representing the string of user actions as a sequence of symbols and computing a minimum edit distance between the string of user actions and the predetermined sequence as a minimum number of symbol replacement, deletion and insertion operations that are required to transform the string of user actions into the predetermined sequence or the predetermined sequence into the string of user actions;
based on the comparison, evaluating whether at least one prior user has attempted the predetermined sequence and, if so, implementing a procedure to avoid the user repeating the prior attempt.

* * * * *